(12) United States Patent
Koike et al.

(10) Patent No.: US 8,253,857 B2
(45) Date of Patent: Aug. 28, 2012

(54) BROADCASTING RECEIVING APPARATUS

(75) Inventors: Tsutomu Koike, Yokohama (JP);
Hiroshi Fujihira, Yokohama (JP)

(73) Assignee: JVC Kenwood Corporation (JP)

( * ) Notice: Subject to any disclaimer, the term of this patent is extended or adjusted under 35 U.S.C. 154(b) by 437 days.

(21) Appl. No.: 12/707,486

(22) Filed: Feb. 17, 2010

(65) Prior Publication Data
US 2010/0214479 A1 Aug. 26, 2010

(30) Foreign Application Priority Data

Feb. 24, 2009 (JP) .................. 2009-041079
Nov. 11, 2009 (JP) .................. 2009-257874

(51) Int. Cl.
*H04N 7/00* (2006.01)
*H04N 5/44* (2006.01)
*H04N 5/268* (2006.01)

(52) U.S. Cl. .................. 348/552; 348/553; 348/706

(58) Field of Classification Search .................. 348/552, 348/553, 725, 730, 705, 706; 725/59, 133, 725/141, 153; *H04N 7/00, 5/44, 5/268, 5/63*
See application file for complete search history.

(56) References Cited

U.S. PATENT DOCUMENTS

| 7,554,614 | B2 * | 6/2009 | Satou ............... 348/706 |
| 8,056,104 | B2 * | 11/2011 | Stecyk et al. ............. 348/553 |
| 2002/0149704 | A1 * | 10/2002 | Kano et al. ............. 348/706 |
| 2008/0075432 | A1 | 3/2008 | Cilluffo |
| 2009/0201420 | A1 * | 8/2009 | Brown et al. ............. 348/552 |

* cited by examiner

*Primary Examiner* — Sherrie Hsia
(74) *Attorney, Agent, or Firm* — Cantor Colburn LLP

(57) ABSTRACT

The portable player is connected to a first connector, and the PC is connected to a second connector. A first connection detecting unit detects whether the portable player is connected, and a second connection detecting unit detects whether the PC is connected. A central processing unit (CPU) switches to a reproduction mode in which an audio signal based on audio data reproduced by the portable player is supplied by the audio processing unit to the speaker, or a PC communication mode in which the portable player and the PC are connected to be in a state in which they can communicate with each other.

9 Claims, 10 Drawing Sheets

BROADCASTING RECEIVING APPARATUS

CROSS-REFERENCE TO RELATED PATENT APPLICATIONS

This application claims the benefit of Japanese Patent Application No. 2009-041079, filed on Feb. 24, 2009 and Japanese Patent Application No. 2009-257874, filed on Nov. 11, 2009 in the Japan Patent Office, the disclosure of which is incorporated herein in its entirety by reference.

BACKGROUND OF THE INVENTION

1. Field of the Invention

The present invention relates to a broadcasting receiving apparatus that can be connected to a portable player.

2. Description of the Related Art

Portable players that store audio data or video data as digital data obtained by compressing contents of a music or a video image in a predetermined compression format in a recording medium such as a semiconductor memory and reproduce the audio data or video data have been widely used. The audio data or video data is referred to as contents data. Contents data stored in a portable player is usually managed by a personal computer (PC). A portable player and a PC are connected to each other via an dedicated universal serial bus (USB) cable or the like and thus contents data stored in the PC is transmitted to the portable player and is stored in the portable player.

As an example of portable players, Patent Document 1 discloses a technology for connecting a portable player and an external audio/video device, providing the data output from the portable player to the external audio/video device, and displaying the data.

PRIOR ART DOCUMENT

[Patent Document 1] U.S. patent application publication US 2008/0075432 A1

A portable player may be connected to a broadcasting receiving apparatus to output sound based on audio data reproduced by the portable player from a speaker of the broadcasting receiving apparatus or to display a video image based on video data reproduced by the portable player on a display unit of the broadcasting receiving apparatus. When contents data that is not stored in the portable player but is stored in the PC needs to be reproduced by the portable player, the portable player has to be detached from the broadcasting receiving apparatus and connected to the PC via a cable or the like. The contents data stored in the PC is transmitted to the portable player and is stored in the portable player, and then, the portable player should be detached from the PC so that the portable player can be connected to the broadcasting receiving apparatus.

When the portable player is connected to an external device such as a broadcasting receiving apparatus, if new contents data is to be added to the portable player, contents data is to be replaced with new contents data, or already-stored contents data is to be deleted, a user inconveniently has to detach the portable player from the broadcasting receiving apparatus and connect the portable player to the broadcasting receiving apparatus again. Thus, a broadcasting receiving apparatus that can be conveniently used without the need of making the user to do such a troublesome operation is required.

SUMMARY OF THE INVENTION

To solve the above and/or other problems, the present invention provides a broadcasting receiving apparatus that can perform operations such as addition of contents data stored in a personal computer (PC) to a portable player while the portable player is connected to the broadcasting receiving apparatus.

According to an aspect of the present invention, there is provided a broadcasting receiving apparatus including: an audio signal supplying unit for supplying an audio signal to a speaker; a first connector for connecting a portable player that reproduces audio data; a second connector for connecting a personal computer (PC); a first connection detecting unit for detecting whether the portable player is connected to the first connector; a second connection detecting unit for detecting whether the PC is connected to the second connector; and a switching control unit for switching to a reproduction mode in which an audio signal based on audio data reproduced by the portable player is supplied to the speaker and sound based on the audio signal is generated, or a PC communication mode in which the portable player and the PC are connected to be in a state in which the portable player and the PC can communicate with each other, when the first connection detecting unit detects that the portable player is connected to the first connector and the second connection detecting unit detects that the PC is connected to the second connector.

The broadcasting receiving apparatus may further include a video signal supplying unit for supplying a video signal to a display unit, and the switching control unit may supply the video signal based on video data reproduced by the portable player to the display unit, and may allows a video image based on the video signal to be displayed on the display unit in the reproduction mode.

The broadcasting receiving apparatus may further include a device identification allowing unit for allowing the portable player to identify the broadcasting receiving apparatus as an external device when the portable player is connected to the first connector.

The broadcasting receiving apparatus may further include a signal switching unit for switching to a first state in which the portable player can be controlled by the broadcasting receiving apparatus, or a second state in which the portable player cannot be controlled by the broadcasting receiving apparatus and can be controlled by the PC, wherein the switching control unit controls the signal switching unit to be in the first state in the reproduction mode and the signal switching unit to be in the second state in the PC communication mode.

The broadcasting receiving apparatus may further include: a power supply unit for generating power for operating the broadcasting receiving apparatus; and a power supply switching unit including a first switch for supplying power generated by the power supply unit to the portable player in the reproduction mode and power generated by the PC to the portable player in the PC communication mode.

The power supply switching unit may further include a second switch that is switched depending on whether power supplied by the power supply unit or the PC is to be supplied to the portable player, and the switching control unit may temporarily cut off power supply to the portable player by using the second switch according to a switching timing at which the reproduction mode is switched to the PC communication mode and at which the PC communication mode is switched to the reproduction mode.

The switching control unit may control the second switch to start cutoff of power supply before the switching timing and to restart power supply after the switching timing so that the switching timing is within time at which power supply to the portable player is cut off, or to temporarily cut off power supply to the portable player after the switching timing.

The broadcasting receiving apparatus may further include a display control unit for controlling the broadcasting receiving apparatus in the reproduction mode to display on the display unit an information indicating that the reproduction mode can be switched to the PC communication mode.

The broadcasting receiving apparatus may further include a display control unit for controlling the broadcasting receiving apparatus in the PC communication mode to display on the display unit an information indicating that the PC communication mode can be switched to the reproduction mode.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
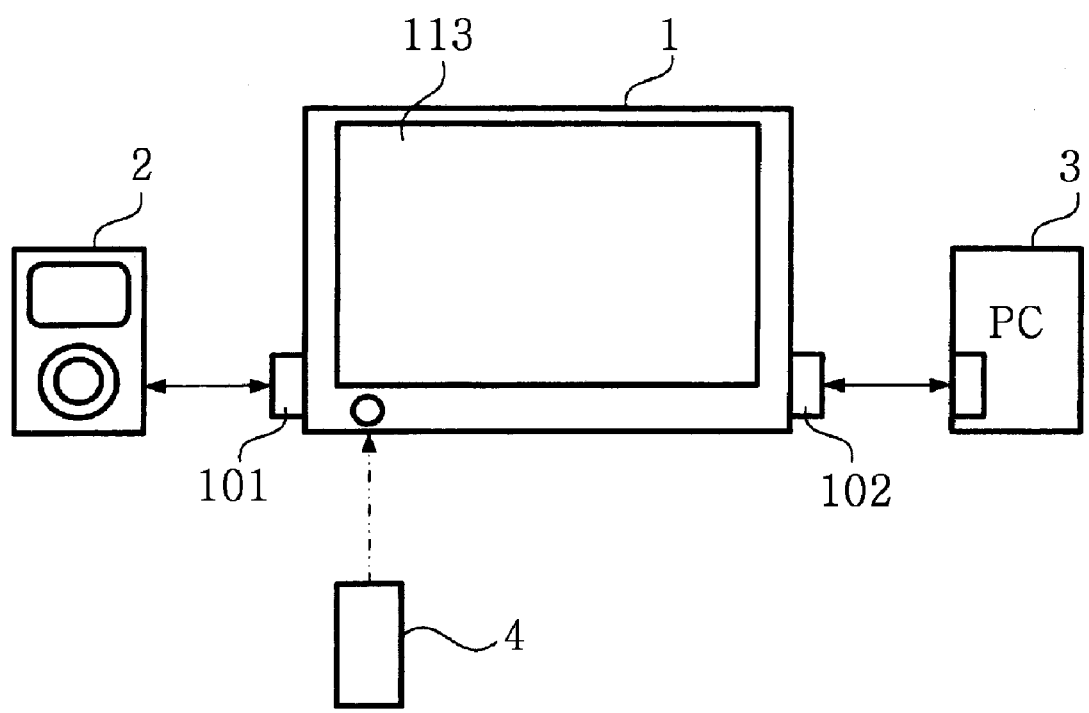
FIG. 1 is a schematic view of a structure showing an embodiment of the present invention.

Hereinafter, embodiments of the broadcasting receiving apparatus of the present invention will be explained with reference to the attached drawings. Referring to FIG. 1, the broadcasting receiving apparatus 1 according to the present embodiment includes a connector 101 and a connector 102. A portable player 2 is connected to the connector 101 and can be freely attached thereto or detached therefrom. A personal computer (PC) 3 is connected to the connector 102 and can be freely attached thereto or detached therefrom. A universal serial bus (USB) cable may be used for connecting the broadcasting receiving apparatus to the portable player 2 and the PC 3. The broadcasting receiving apparatus 1 may further include a connection terminal that can be connected to a connection terminal of the portable player 2 and may form a mounting unit on which the portable player 2 can be mounted, and thus the portable player 2 may be mounted directly on the mounting unit without using a cable. Also, the broadcasting receiving apparatus 1 and the portable player 2 or the PC 3 may be connected to each other by using a wireless technology such as a wireless USB.

When the portable player 2 is connected to the broadcasting receiving apparatus 1 as shown in FIG. 1, a remote-control transmitter 4 of the broadcasting receiving apparatus 1 is operated to reproduce contents data stored in the portable player 2. A video image of video data that is reproduced by the portable player 2 is displayed on a display unit 113 of the broadcasting receiving apparatus 1. Sound (sound wave) of audio data that is reproduced by the portable player 2 is output from a speaker (not shown in FIG. 1).

The contents data that may be transmitted to the portable player 2 is stored in the PC 3. In the present embodiment, as will be described later, in case that the contents data stored in the portable player 2 is reproduced and the reproduced contents data is video-displayed on the display unit 113 of the broadcasting receiving apparatus 1 or outputted from the speaker of the broadcasting receiving apparatus 1, or in case that the contents data is transmitted to the portable player 2 from the PC 3 via the broadcasting receiving apparatus 1, it can happen while the portable player 2 is connected to the broadcasting receiving apparatus 1.

Also, iPod (registered trademark) manufactured by Apple Inc. may be used as the portable player 2, for example. Obviously, a portable player other than iPod may be used as the portable player 2. Contents data may be accumulated in the portable player 2 by downloading the contents data such as music data or video data that has been distributed via the Internet or the like, to the PC 3 and transmitting the contents data to the portable player 2 from the PC 3.

Figure 2:
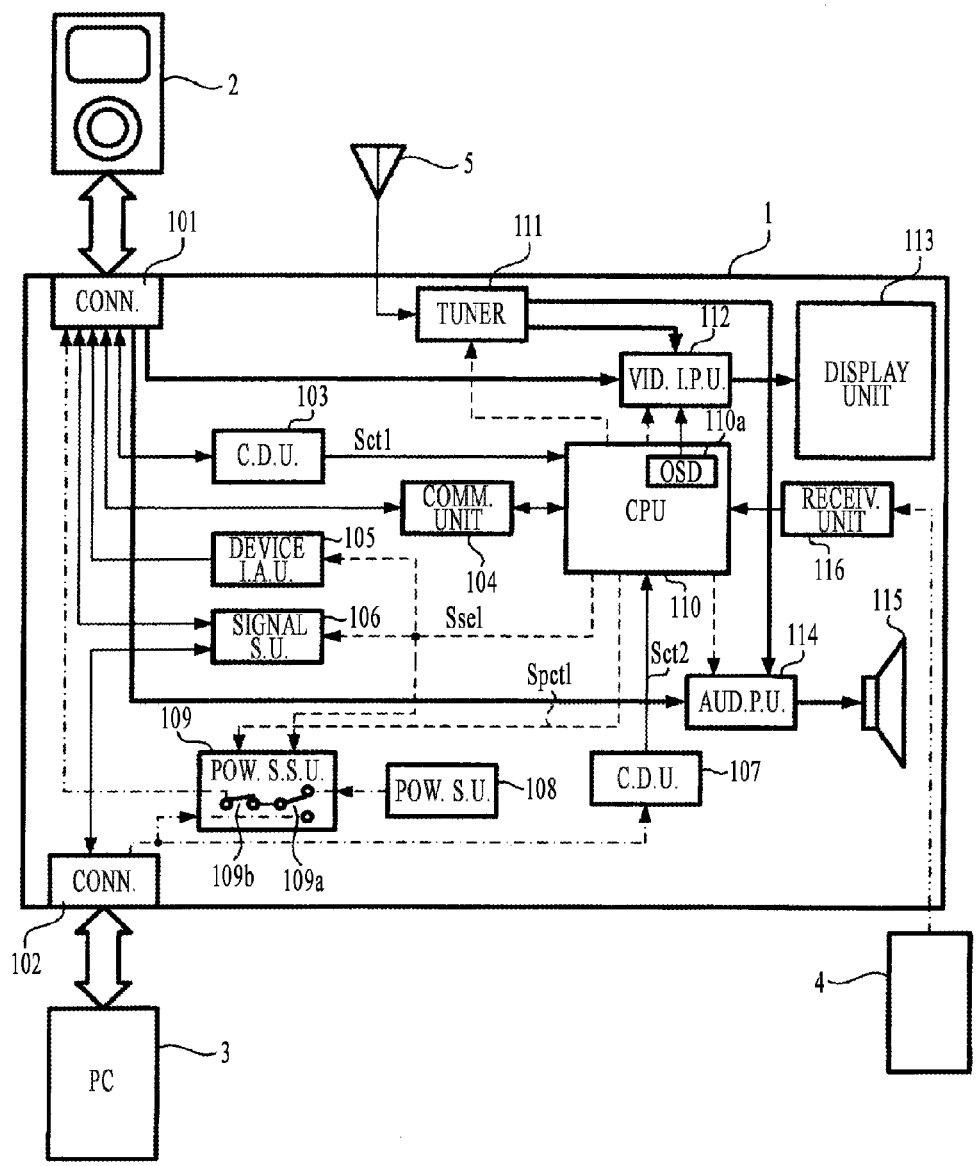
FIG. 2 is a block diagram of a detailed structure showing an embodiment of the present invention.

Next, the specific structure and operation of the broadcasting receiving apparatus 1 will be described with reference to FIG. 2. Referring to FIG. 2, the portable player 2 is connected to the connector 101, and the PC 3 is connected to the connector 102. A first connection detecting unit 103, a communication unit 104, a device identification allowing unit 105, a signal switching unit 106, a power supply switching unit 109, a video image processing unit 112, and an audio processing unit 114 are connected to the connector 101. The signal switching unit 106, a second connection detecting unit 107, and the power supply switching unit 109 are connected to the connector 102. The first connection detecting unit 103 detects that the portable player 2 is (or has been) connected to the connector 101, and supplies a connection detecting signal Sct1 to a central processing unit (CPU) 110 that is a controller. The connection detecting signal Sct1 is at a high level, that is, "1", when the first connection detecting unit 103 detects the connection; otherwise, the connection detecting signal Sct1 is at a low level, that is, "0", when the first connection detecting unit 103 does not detect the connection.

The communication unit 104 is an interface through which the CPU 110 communicates with the portable player 2. In the present embodiment, the CPU 110 communicates with the portable player 2 by using a universal asynchronous receiver/transmitter (UART) interface so that the broadcasting receiving apparatus 1 may control the portable player 2. In other words, the portable player 2 may be controlled by a manipulation of the remote-control transmitter 4. Instead of using the UART interface communication, the portable player 2 may also be controlled through USB communication.

The device identification allowing unit 105 is a circuit unit that allows the portable player 2 to recognize that the portable player 2 has been connected to an external device (in the present embodiment, the broadcasting receiving apparatus 1). The portable player 2 is connected to the device identification allowing unit 105 via the connector 101, thereby recognizing that the portable player 2 has been connected to the external device, which is an accessory device for the portable player 2. The internal structure of the device identification allowing unit 105 is based on the type (manufacturer) of the portable player 2. Which circuit is to be connected to the portable player 2 so that the portable player 2 recognizes that the portable player 2 has been connected to the external device depends on the specification of the portable player 2. Thus, the device identification allowing unit 105 may be based on the specification of the portable player 2.

As will be described later, the broadcasting receiving apparatus 1 is configured to optionally switch to one selected from the group consisting of a television (TV) mode in which a user watches a broadcasting program received by a tuner 111, a reproduction mode in which a video image of contents data reproduced by the portable player 2 is displayed by the broadcasting receiving apparatus 1 or sound of the contents data is output from a speaker 115 of the broadcasting receiving apparatus 1, and a PC communication mode in which the portable player 2 communicates with the PC 3. The connectors 101 and 102 are connected to the signal switching unit 106 via a USB signal line. The signal switching unit 106 switches to the TV mode/the reproduction mode, or the PC communication mode depending on whether a USB signal line from the connector 101 and a USB signal line from the connector 102 are to be connected or not.

The connection detecting unit 107 detects that the PC 3 is (has been) connected to the connector 102, and supplies a connection detecting signal Sct2 to the CPU 110. For example, the connection detecting signal Sct2 is at a high level, that is, "1" when the connection detecting unit 107 detects the connection; otherwise, the connection detecting signal Sct2 is at a low level, that is, "0", when the connection detecting unit 107 does not detect the connection. Although not shown in FIG. 2, a power supply unit 108 is connected to a commercial alternating current (AC) power supply, for example, to generate power, and supplies power to each of the elements of the broadcasting receiving apparatus 1. Also, the power from the power supply unit 108 is supplied to the power supply switching unit 109. Power generated by the PC 3 is supplied to the power supply switching unit 109 via the connector 102.

The power supply switching unit 109 includes a switch 109a for supplying either power generated by the power supply unit 108 or power generated by the PC 3 to the portable player 2, and a switch 109b which switches depending on whether power is to be supplied to the portable player 2 or not. In FIG. 2, a line indicated by a one-dot dashed line is a power supply line. In FIG. 2, the switch 109b is disposed in the power supply switching unit 109 but the switch 109b may be disposed outside the power supply switching unit 109.

The tuner 111 receives a broadcast wave signal for TV broadcasting input from an antenna 5 and demodulates the received broadcast wave signal into a predetermined program signal. In the present embodiment, the broadcasting receiving apparatus 1 is a digital broadcasting receiving apparatus that receives digital TV broadcasting. The digital TV broadcasting may use any standard such as the ARIB standard, ATSC standard, or DVBT standard. The broadcasting receiving apparatus 1 may be a broadcasting receiving apparatus that receives analog TV broadcasting. Also, in FIG. 1, the broadcast wave signal is input from the antenna 5 but the broadcast wave signal may be input from a cable. Video data, that is output from the tuner 111 and is compressed into the MPEG2 format, is input to the video image processing unit 112, and audio data that is compressed into the MPEG2 AAC format or Dolby AC3 format (Dolby is registered trademark) is input to the audio processing unit 114.

The video image processing unit 112 expands the compressed video data and performs various signal processing, and supplies a video signal to a display unit 113. The video image processing unit 112 is a video signal supplying unit for supplying the video signal to the display unit 113. The display unit 113 is an arbitrary display unit such as a liquid crystal panel, and displays a video image based on the input video signal. The CPU 110 includes an on-screen display (OSD) generating unit 110a for displaying information such as characters or diagrams on the display unit 113. The video image processing unit 112 includes an overlap circuit for allowing an OSD signal generated by the OSD generating unit 110a to overlap the video signal. In FIG. 2, the OSD generating unit 110a is installed in the CPU 110 but the OSD generating unit 110a may also be installed outside the CPU 110. The CPU 110 is a display control unit for controlling various information to be displayed on the display unit 113.

The audio processing unit 114 expands the compressed audio data and performs various signal processing, and supplies an audio signal to the speaker 115. The audio processing unit 114 is an audio signal supply unit for supplying the audio signal to the speaker 115. The audio processing unit 114 includes an amplifier which adjusts the level of sound generated from the speaker 115. The speaker 115 generates sound based on the input audio signal. The display unit 113 and the speaker 115 may be installed outside the broadcasting receiving apparatus 1.

A video signal based on the video data reproduced by the portable player 2 is also input to the video image processing unit 112 via the connector 101. In the present embodiment, the video signal output from the portable player 2 is an analog video signal but digital video data may be output and supplied to the video image processing unit 112. An audio signal based on the audio data reproduced by the portable player 2 is input to the audio processing unit 114 via the connector 101. In the present embodiment, the audio signal output from the portable player 2 is an analog audio signal but digital audio data may be output and supplied to the audio processing unit 114. In FIG. 2, a thick solid line is a signal line of video data (video signal) or audio data (audio signal).

A remote controller signal, for example, by infrared rays, that is generated by the remote-control transmitter 4, is received by a receiving unit 116. The receiving unit 116 switches the received remote controller signal into an electric signal and supplies the electric signal to the CPU 110. In FIG. 2, a two-dot dashed line is a signal line of the remote controller signal by infrared rays. The remote-control transmitter 4 may switch to the TV mode, the reproduction mode or the PC communication mode. The CPU 110 controls the device identification allowing unit 105, the signal switching unit 106, the power supply switching unit 109, the video image processing unit 112, and the audio processing unit 114 according to mode switching operations by the remote-control transmitter 4. Also, the CPU 110 controls the tuner 111 so as to switch a received channel in the TV mode. The CPU 110 controls the audio processing unit 114 so as to adjust the level of sound generated from the speaker 115 in the TV mode or the reproduction mode.

The broadcasting receiving apparatus 1 is in the TV mode when the portable player 2 is not connected to the connector 101. When the portable player 2 is connected to the connector 101 and the connection detecting signal Sct1 from the first connection detecting unit 103 is at a high level, the broadcasting receiving apparatus 1 may switch from the current mode to the TV mode or the reproduction mode. A user may select the TV mode or the reproduction mode by a mode switching operation by the remote-control transmitter 4. The TV mode is a mode in which a video image of a video signal of a broadcasting program received by the tuner 111 is displayed on the display unit 113 or sound of an audio signal of the broadcasting program is generated from the speaker 115. The reproduction mode is a mode in which a video image of a video signal reproduced by the portable player 2 is displayed on the display unit 113 or sound of an audio signal reproduced by the portable player 2 is generated from the speaker 115.

In the present embodiment, the portable player 2 is an audio•video player for storing and reproducing the audio data and the video data but may be an audio player for storing and reproducing only the audio data. In this case, the reproduction mode is a mode in which sound of the audio signal reproduced by the portable player 2 is generated from the speaker 115.

When it is detected that the portable player 2 has been connected to the connector 101, the TV mode may be automatically switched to the reproduction mode, and when it is detected that the portable player 2 has been detached from the connector 101, the reproduction mode may be automatically switched to the TV mode.

Next, each mode will be described in detail. When the portable player 2 and the PC 3 are connected to the broadcasting receiving apparatus 1 as shown in FIG. 2, the user may switch to the TV mode, the reproduction mode or the PC communication mode as a mode of the broadcasting receiving apparatus 1. As described above, the only difference between the TV mode and the reproduction mode is that a source for a video image display or sound output is the tuner 111 or the portable player 2. In the TV mode and the reproduction mode, the states of the device identification allowing unit 105, the signal switching unit 106, and the power supply switching unit 109 are the same and thus the reproduction mode and the PC communication mode will be mainly described below.

When the broadcasting receiving apparatus 1 is in the reproduction mode, the CPU 110 supplies a mode switching signal Ssel, for example, a signal at a high level, that is, "1", to the device identification allowing unit 105, the signal switching unit 106, and the power supply switching unit 109. When the mode switching signal Ssel is at a high level, the device identification allowing unit 105 allows the portable player 2 to identify the broadcasting receiving apparatus 1 as an external device. Also, when the mode switching signal Ssel is at a high level, the signal switching unit 106 allows the USB signal line from the connector 101 and the USB signal line from the connector 102 to be disconnected from each other.

Thus, when the portable player 2 is connected to the connector 101, the portable player 2 may recognize the broadcasting receiving apparatus 1 as an accessory device, and the broadcasting receiving apparatus 1 may control the portable player 2 through UART communication.

When the mode switching signal Ssel is at a high level, the switch 109a of the power supply switching unit 109 is connected to the power supply unit 108.

Also, the CPU 110 supplies a power supply control signal Spctl for controlling whether power is to be supplied to the portable player 2 or power supply to the portable player 2 is to be cut off, for example, a signal at a high level, that is, "1", to the power supply switching unit 109. When the power supply control signal Spctl is at a high level, the switch 109b of the power supply switching unit 109 is turned on, as shown. The switch 109a is connected to the power supply unit 108 and the switch 109b is turned on, and thus power from the power supply unit 108 is supplied to the portable player 2.

Also, when the portable player 2 is not connected to the connector 101 and the broadcasting receiving apparatus 1 has to select only the TV mode, the CPU 110 supplies the power supply control signal Spctl, for example, a signal at a low level, that is, "0", to the power supply switching unit 109. Thus, it is preferable that the switch 109b is turned off so that power may not be supplied to the connector 101.

Next, a case where the broadcasting receiving apparatus 1 switches from the reproduction mode to the PC communication mode will be described. When the user manipulates the remote-control transmitter 4 and makes an instruction to switch from the reproduction mode to the PC communication mode, a command A for switching from the reproduction mode to the PC communication mode is input to the CPU 110. When the command A is input to the CPU 110, the CPU 110 supplies the mode switching signal Ssel, for example, a signal at a low level, that is, "0", to the device identification allowing unit 105, the signal switching unit 106, and the power supply switching unit 109. When the mode switching signal Ssel is at a low level, the device identification allowing unit 105 stops allowing the portable player 2 to identify the broadcasting receiving apparatus 1 as an external device. Also, when the mode switching signal Ssel is at a low level, the signal switching unit 106 allows the USB signal line from the connector 101 and the USB signal line from the connector 102 to be connected.

Thus, the portable player 2 is connected to the PC 3 via the connectors 101 and 102. In this case, the portable player 2 may not be controlled by the broadcasting receiving apparatus 1 but may be controlled by the PC 3.

Also, when the mode switching signal Ssel is at a low level, the switch 109a of the power supply switching unit 109 is connected to the connector 102 side (the PC 3 side). The CPU 110 temporarily switches the power supply control signal Spctl to be at a low level, that is, "0", and supplies the switched power supply control signal Spctl to the power supply switching unit 109 according to that the high level of the mode switching signal Ssel is switched to a low level. When the power supply control signal Spctl is at a low level, the switch 109b of the power supply switching unit 109 is turned off. Thus, the switch 109b is temporarily turned off so that power supply to the portable player 2 may be temporarily cut off.

The CPU 110 switches the power supply control signal Spctl to be at a low level and then re-switches the power supply control signal Spctl to be at a high level after a predetermined amount of time and restarts supplying power to the portable player 2. The timing at which the mode switching signal Ssel is switched from the high level to the low level, and the timing at which the power supply control signal Spctl is switched from the high level to the low level or from the low level to the high level will be described later in detail.

When the switch 109a of the power supply switching unit 109 is connected to the connector 102 and the switch 109b is turned on, power (USB Vbus) from the PC 3 is supplied to the portable player 2.

Also, a case where the broadcasting receiving apparatus 1 in the PC communication mode is switched to the reproduction mode will be described. When the user manipulates the remote-control transmitter 4 to make an instruction to switch from the PC communication mode to the reproduction mode, a command B for switching from the PC communication mode to the reproduction mode is input to the CPU 110. When the command B is input to the CPU 110, the CPU 110 switches the mode switching signal Ssel to be at the high level. Thus, each of the elements of the broadcasting receiving apparatus 1 is returned to the state of the above-mentioned reproduction mode.

The CPU 110 switches the power supply control signal Spctl to be at a low level temporarily and then re-switches the power supply control signal Spctl to be at a high level after a predetermined amount of time according to that the mode switching signal Ssel is switched from a low level to a high level, like in the case where the mode switching signal Ssel is switched from the high level to the low level.

Figure 3:
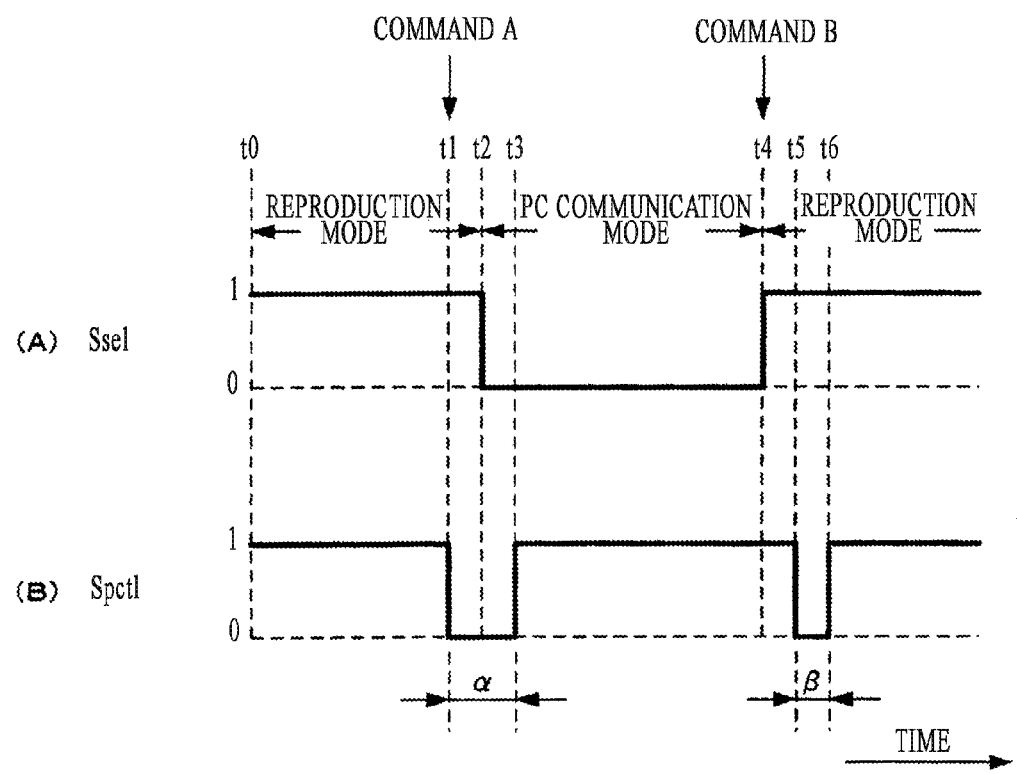
FIG. 3 is a view for explaining mode switching, according to an embodiment of the present invention.

The timing at which the level of the mode switching signal Ssel and the level of the power supply control signal Spctl is switched will now be described with reference to FIG. 3 in detail. FIG. 3(A) denotes the mode switching signal Ssel, and FIG. 3(B) denotes the power supply control signal Spctl. After time t0, the mode switching signal Ssel and the power supply control signal Spctl are at the high level, and the broadcasting receiving apparatus 1 is in the reproduction mode. When the user makes an instruction to switch from the reproduction mode to the PC communication mode at time t1, the command A is input to the CPU 110. As shown in FIG. 3(B), right after the command A is input to the CPU 110, the power supply control signal Spctl is switched to the low level from the high level. The CPU 110 allows the power supply control signal Spctl to be maintained at the low level for a predetermined period α and then switches the level of the power supply control signal Spctl to the high level at time t3.

As shown in FIG. 3(A), the CPU 110 switches the mode switching signal Ssel from the high level to the low level at time t2 in the period a during which the power supply control signal Spctl is at the low level. In this way, when the command A is input to the CPU 110, the CPU 110 switches the level of the power supply control signal Spctl to be at the low level temporarily according to that the level of the mode switching signal Ssel is switched from the high level to the low level.

As described above, the level of the mode switching signal Ssel is switched from the high level to the low level so that the switch 109a of the power supply switching unit 109 may be switched from the power supply unit 108 to the PC 3. However, according to the specification of the portable player 2, power from the PC 3 may not be supplied to the portable player 2 simply by changing the connection point of the switch 109a from the power supply unit 108 to the PC 3. Thus, in the case of the portable player 2 having the specification, the level of the power supply control signal Spctl is temporarily switched to the low level so that a source for supplying power to the portable player 2 may be changed to the PC 3 from the power supply unit 108.

The broadcasting receiving apparatus 1 is switched from the reproduction mode to the PC communication mode by switching the mode switching signal Ssel shown in FIG. 3(A) from the high level to the low level and by both switching Spctl from the high level to the low level and switching from the low level to the high level as shown in FIG. 3(B). The broadcasting receiving apparatus 1 is in the PC communication mode from time t2. However, during a period from time t2 to time t3, power is not supplied to the portable player 2. Thus, the portable player 2 may be able to communicate with the PC 3 after time t3.

When the level of the power supply control signal Spctl is switched from the low level to the high level before the level of the mode switching signal Ssel is switched from the high level to the low level, a source for supplying power to the portable player 2 is not changed to the PC 3 from the power supply unit 108. Thus, the timing at which the level of the power supply control signal Spctl is switched from the low level to the high level needs to be after the timing at which the level of the mode switching signal Ssel is switched from the high level to the low level. The overall period a shown in FIG. 3(B) may be after time t2. However, when the overall period a is after time t2, the timing at which the portable player 2 is able to communicate with the PC 3 is later than time t3. Thus, it is preferable that the timing at which the level of the mode switching signal Ssel is switched from the high level to the low level is within the period a during which the power supply control signal Spctl is at the low level.

When the user makes an instruction to switch from the PC communication mode to the reproduction mode at time t4, the command B is input to the CPU 110. As shown in FIG. 3(A), right after the command B is input to the CPU 110, the mode switching signal Ssel is switched from the low level to the high level. As shown in FIG. 3(B), the CPU 110 switches the power supply control signal Spctl from the high level to the low level at time t5, allows the power supply control signal Spctl to be maintained at the low level for a predetermined period β and then switches the power supply control signal Spctl to the high level at time t6. In this way, when the command B is input to the CPU 110, the CPU 110 switches the power supply control signal Spctl from the high level to the low level temporarily according to that the level of the mode switching signal Ssel is switched from the low level to the high level.

Even when the PC communication mode is switched to the reproduction mode, according to the specification of the portable player 2, power from the power supply unit 108 may not be supplied to the portable player 2 simply by changing the connection point of the switch 109a from the PC 3 to the power supply unit 108. Thus, in the case of the portable player 2 having the specification, the power supply control signal Spctl is temporarily switched to the low level so that a source for supplying power to the portable player 2 may be changed to the power supply unit 108 from the PC 3.

The broadcasting receiving apparatus 1 is switched from the PC communication mode to the reproduction mode by switching the mode switching signal Ssel shown in FIG. 3(A) from the low level to the high level and by both switching the high level of the power supply control signal Spctl shown in FIG. 3(B) to the low level and switching the low level to the high level. The broadcasting receiving apparatus 1 is in the reproduction mode from time t4. However, during a period from time t4 to time t6, power is not supplied to the portable player 2. Thus, the portable player 2 may be able to communicate with the PC 3 after time t6.

Thus, the timing at which the level of the power supply control signal Spctl is switched from the low level to the high level needs to be after the timing at which the level of the mode switching signal Ssel is switched from the low level to the high level. Even when the PC communication mode is switched to the reproduction mode, the timing at which the level of the mode switching signal Ssel is switched from the low level to the high level may be within the period β during which the power supply control signal Spctl is at the low level.

As described above, the CPU 110 is a switching control unit that switches to either the reproduction mode in which an audio signal based on at least audio data reproduced by the portable player 2 is supplied to the speaker 115 and sound based on the audio signal is output or the PC communication mode in which the portable player 2 is connected to the PC 3 to communicate with each other.

Figure 4:
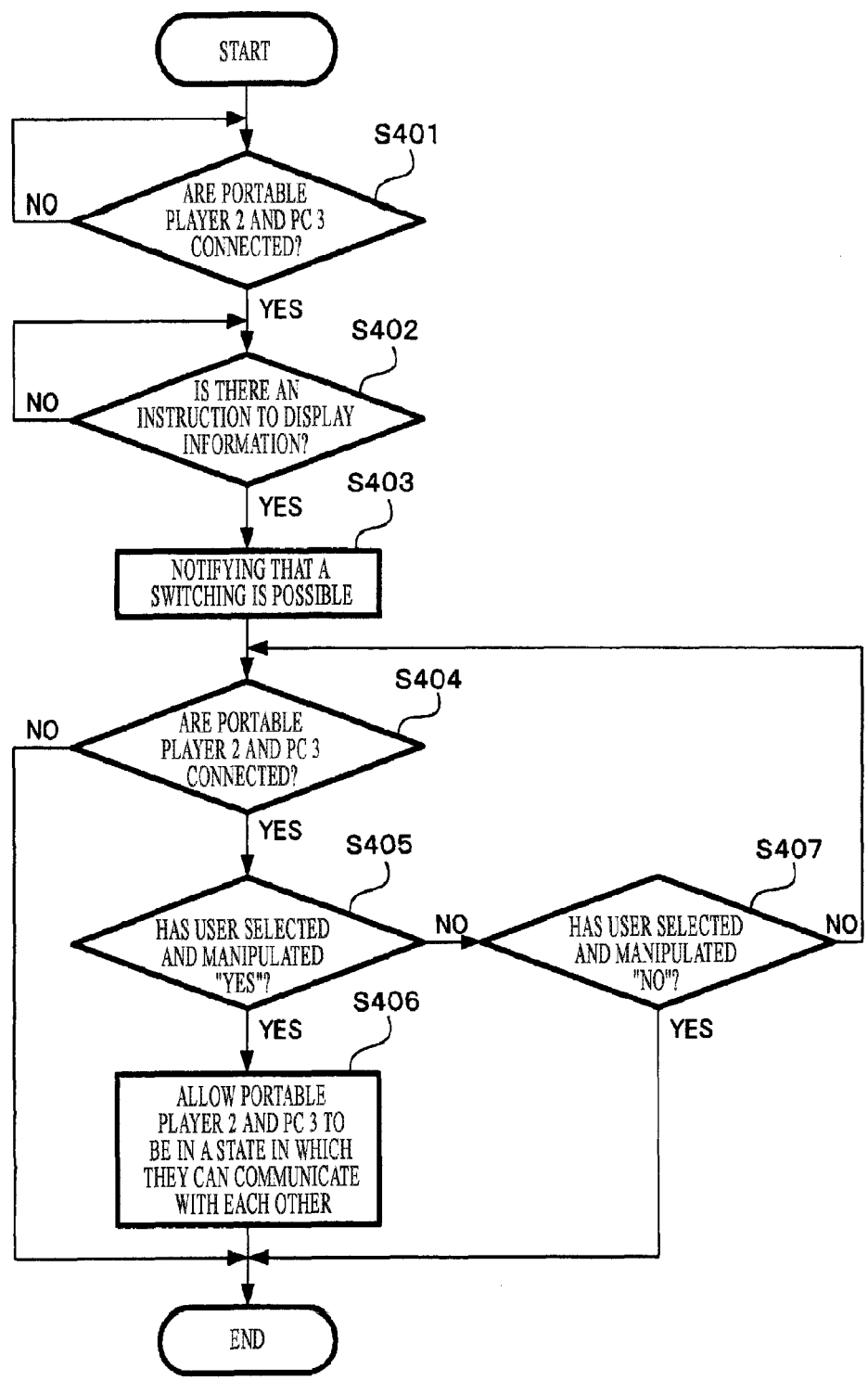
FIG. 4 is a flowchart showing a mode switching from a reproduction mode to a personal computer (PC) communication mode according to an embodiment of the present invention.

In addition, a process performed by the CPU 110 when being switched from the reproduction mode into the PC communication mode will be described with reference to FIG. 4 and FIG. 5. Referring to FIG. 4, in Step S401, the CPU 110 determines whether both the portable player 2 and the PC 3 are connected to the broadcasting receiving apparatus 1 or not. If a condition that both the portable player 2 and the PC 3 are connected to the broadcasting receiving apparatus 1 is not satisfied (NO), the process returns to Step S401. Otherwise, if the condition is satisfied (YES), the process proceeds to Step S402.

In Step S402, the CPU 110 determines whether an instruction to display information indicating that the reproduction mode can be switched to the PC communication mode on a screen of the display unit 113 has been made or not. If there is no instruction (NO), the process returns to Step S402; otherwise, if there is an instruction (YES), the process proceeds to Step S403. For example, the instruction of image display is made by manipulating a display button for executing image display, which is formed in a menu. In Step S403, the CPU 110 allows the information indicating that the reproduction mode can be switched to the PC communication mode to be displayed on the screen of the display unit 113. Step S402 may be omitted.

Figure 5:
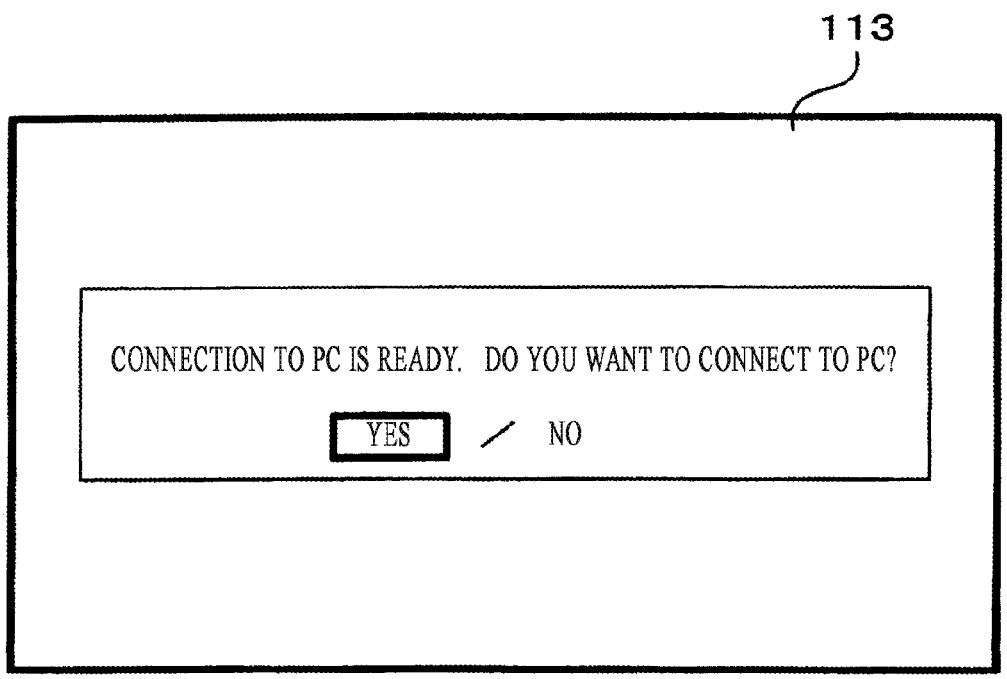
FIG. 5 shows an example of information displayed on a display unit when the mode switching of FIG. 4 is processed.

FIG. 5 shows the information displayed on the screen of the display unit 113 in Step S403. Referring to FIG. 5, a text, "A connection to the PC is ready. Do you want to connect to the PC?" and buttons "Yes" and "No" are displayed in a rectangular frame. In FIG. 5, the selected button "Yes" is surrounded with a thick solid line and is selected.

Referring back to FIG. 4, in Step S404, the CPU 110 determines again whether both the portable player 2 and the PC 3 are connected to the broadcasting receiving apparatus 1 or not. The same determination as in Step S401 is performed in order to finish the process before the button "Yes" or "No" is selected or while the button either "Yes" or "No" is selected, when at least one of the group consisting of the portable 2 and the PC 3 is detached from the broadcasting receiving apparatus 1. In Step S404, if the condition in which both are connected is not satisfied (NO), the process is finished. Otherwise, if the condition that both are connected is satisfied (YES), the process proceeds to Step S405. Also, Step S404 may be omitted.

In Step S405, the CPU 110 determines whether the button "Yes" is selected and manipulated or not. The manipulation of the button "Yes" means that a determination button (not shown) of the remote-control transmitter 4 is pressed when the button "Yes" is selected as shown in FIG. 5, for example. A case where it is determined in Step S405 that the button "Yes" is selected and manipulated is a case where the command A is input to the CPU 110. If it is determined in Step S405 that the button "Yes" is selected and manipulated (YES), the CPU 110 allows the portable player 2 and the PC 3 to be in a state in which they can communicate with each other, in Step S406. In other words, as described above, the CPU 110 stops the operation by the device identification allowing unit 105, allows the USB signal line to be connected by the signal switching unit 106, connects the switch 109a of the power supply switching unit 109 to the connector 102, and allows the switch 109b to be temporarily maintained at a low level, as shown in FIG. 3(B), so that the portable player 2 may be operated with power output from the PC 3.

If it is not determined in Step S405 that the button "Yes" is selected and manipulated (NO), in Step S407, the CPU 110 determines whether the button "No" has been selected and manipulated or not. When the button "No" is selected and manipulated, in the state of FIG. 5, the button "No" has to be selected by a cursor button (not shown) of the remote-control transmitter 4, and a determination button has to be pressed. If it is determined in Step S407 that the button "No" has been selected and manipulated (YES), the process is finished; otherwise, if it is not determined in Step S407 that the button "No" has been selected and manipulated (NO), the process returns to Step S404.

In the PC communication mode, the broadcasting receiving apparatus 1 may use software for transmitting contents to the portable player 2 that is installed in the PC 3 to transmit new contents data to the portable player 2 and add the contents data to the portable player 2. Also, contents data may be replaced, already-stored contents data may be deleted or the contents data stored by the portable player 2 may be returned to the PC 3.

Figure 6:
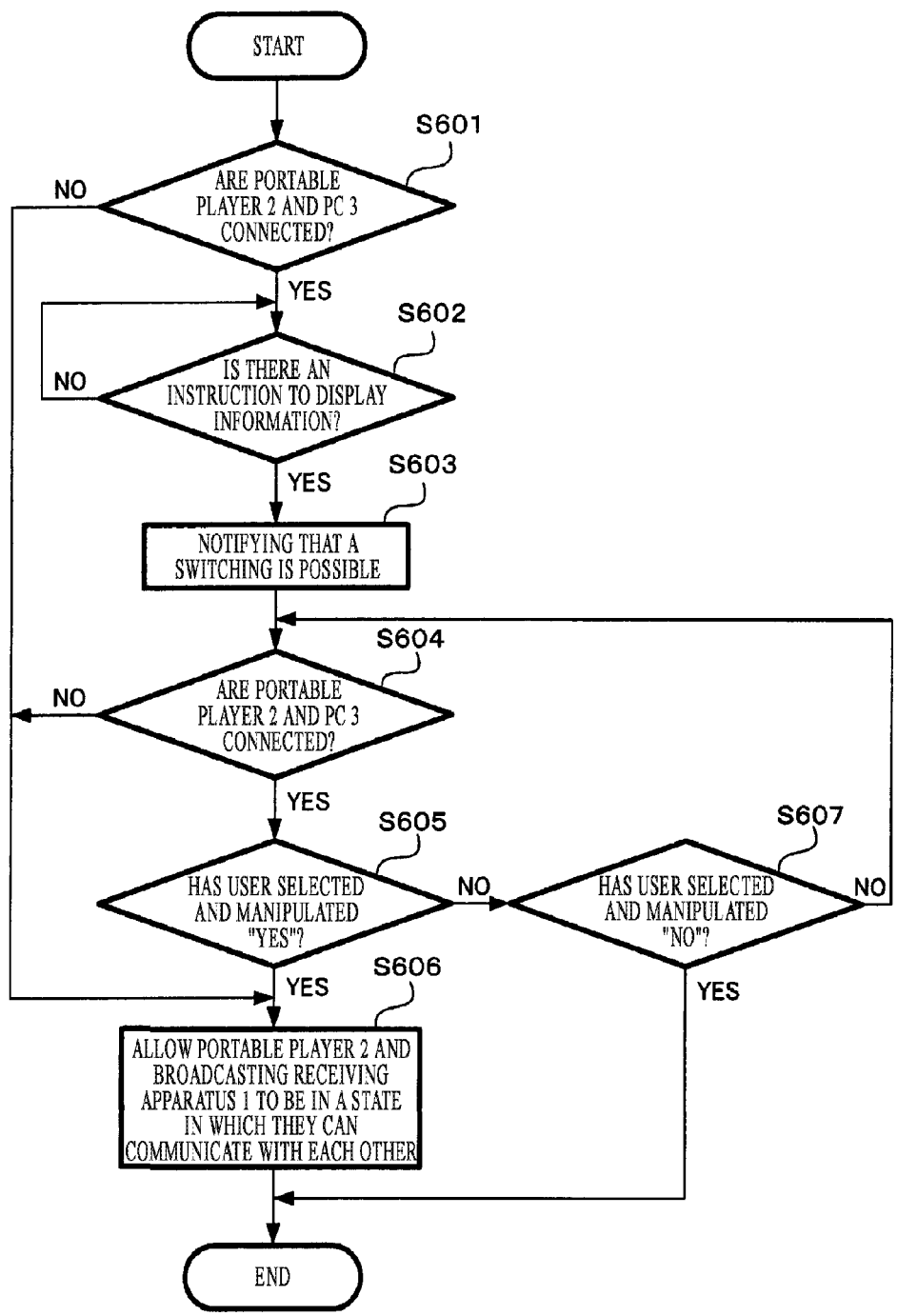
FIG. 6 is a flowchart showing an example of a mode switching processing from the PC communication mode to the reproduction mode according to an embodiment of the present invention.
Figure 7:
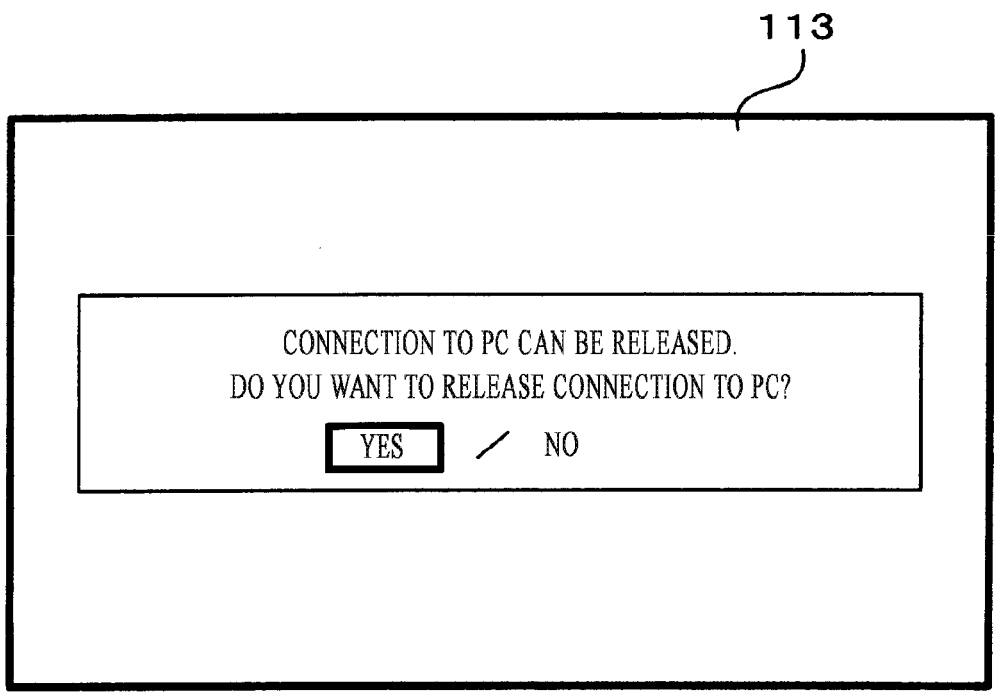
FIG. 7 shows an example of information displayed on the display unit when the mode switching of FIG. 6 is processed.

Next, an process when switching from the PC communication mode to the reproduction mode will be described with reference to FIG. 6 and FIG. 7. Referring to FIG. 6, in Step S601, the CPU 110 determines whether the portable player 2 and the PC 3 are connected to the broadcasting receiving apparatus 1 or not. If a condition that both are connected is not satisfied (NO), the process proceeds to Step S606. Otherwise, if the condition that both are connected is satisfied (YES), the process proceeds to Step S602. In Step S602, the CPU 110 determines whether an instruction to display on the screen of the display unit 113 information indicating that the PC communication mode can be released and switched to the reproduction mode has been made or not. If there is no instruction (NO), the switching operation of the CPU 110 returns to Step S602; otherwise there is an instruction (YES), the process proceeds to Step S603.

In Step S603, the CPU 110 allows the information indicating that the PC communication mode can be switched to the reproduction mode to be displayed on the screen of the display unit 113. Step S602 may be omitted. FIG. 7 shows the information displayed on the screen of the display unit 113 in Step S602. Referring to FIG. 7, a text, "A connection to the PC can be released. Do you want to release the connection to the PC?", and buttons "Yes" and "No" are displayed in a rectangular frame. The button "Yes" is selected and surrounded with a thick solid line.

Referring back to FIG. 6, in Step S604, the CPU 110 determines again whether the portable player 2 and the PC 3 are connected to the broadcasting receiving apparatus 1 or not. The same determination as in Step S601 is performed to finish the process before the button "Yes" or "No" is selected or while the button "Yes" or "No" is selected, if at least one of the portable 2 and the PC 3 is detached. If in Step S604, the condition that both are connected is not satisfied (NO), the process proceeds to Step S606; otherwise, if the condition that both are connected is satisfied (YES), the process proceeds to Step S605. Also, Step S604 may be omitted.

In Step S605, the CPU 110 determines whether the button "Yes" has been selected and manipulated or not. A case where it is determined in Step S605 that the button "Yes" has been selected and manipulated is a case where the command B is input to the CPU 110. If it is determined in Step S605 that the button "Yes" has been selected and manipulated (YES), the CPU 110 allows the portable player 2 and the broadcasting receiving apparatus 1 to be in a state in which they can communicate with each other, in Step S606. In other words, as described above, the CPU 110 allows the operation by the device identification allowing unit 105, disconnects the USB signal line by the signal switching unit 106, connects the switch 109a of the power supply switching unit 109 to the power supply unit 108, and allows the switch 109b to be temporarily maintained at a low level, as shown in FIG. 3(B), so that the portable player 2 may be operated with power generated by the power supply unit 108.

If it is not determined in Step S605 that the button "Yes" has been selected and manipulated (NO), the CPU 110 determines whether the button "No" has been selected and manipulated or not, in Step S607. If it is determined in Step S607 that the button "No" has been selected and manipulated (YES), the process is finished; otherwise it is not determined that the button "No" has been selected (NO) and manipulated, the process returns to Step S604.

Figure 8:
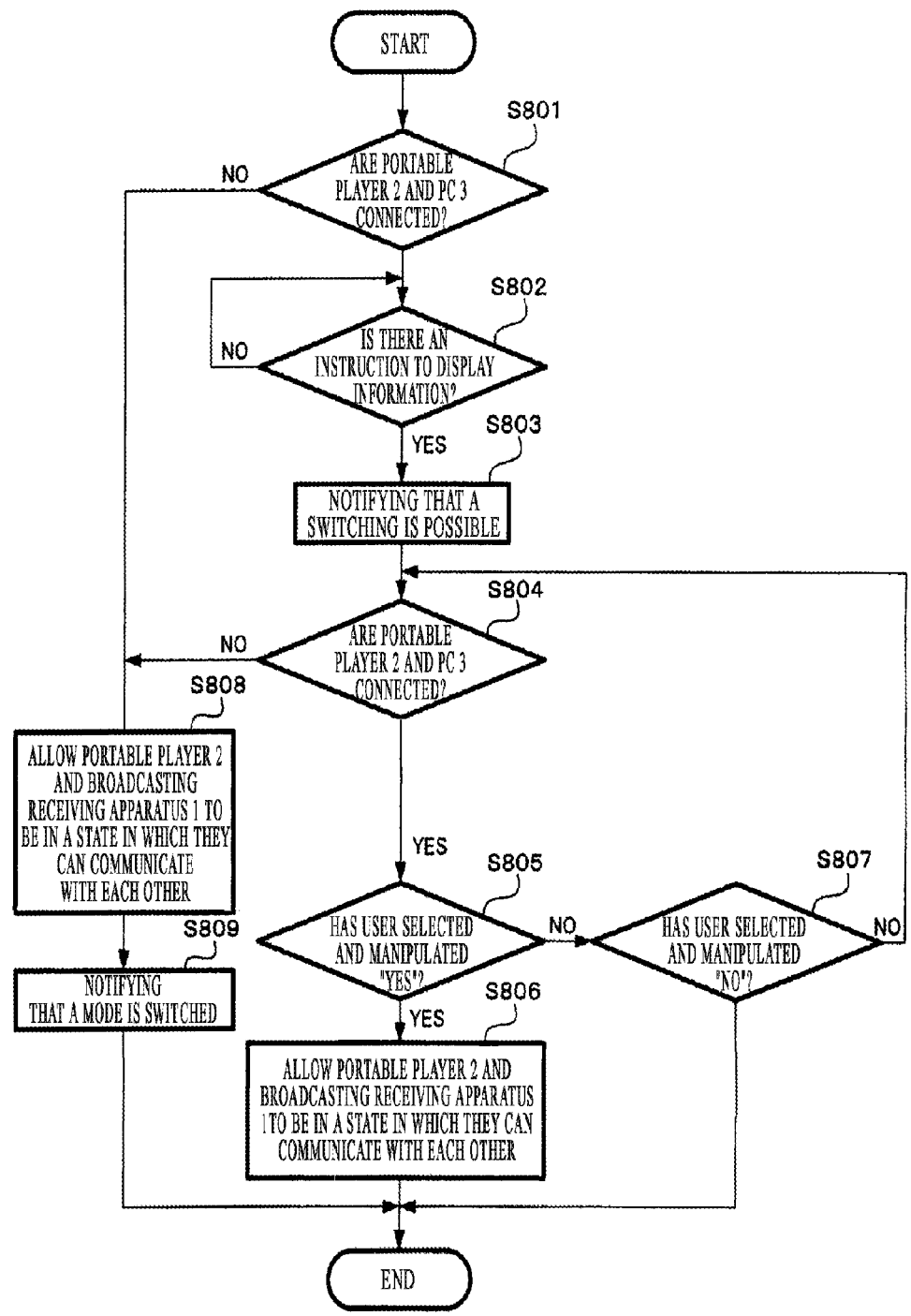
FIG. 8 is a flowchart showing another example of a mode switching from the PC communication mode to the reproduction mode according to an embodiment of the present invention.

FIG. 8 shows an improved embodiment of a process when switching from the PC communication mode to the reproduction mode. Steps S801 through S807 of FIG. 8 are the same as Steps S601 through S607 of FIG. 6 and thus, a description thereof will not be provided here. Referring to FIG. 8, if the condition in which both the portable player 2 and the PC 3 are connected to the broadcasting receiving apparatus 1 is not satisfied (NO) in Steps S801 and S804, the CPU 110 allows the portable player 2 and the broadcasting receiving apparatus 1 to be in a state in which they can communicate with each other, in Step S808. In Step S809, information indicating that the mode is switched to the reproduction mode is displayed, for example, on the screen of the display unit 113.

Figure 9:
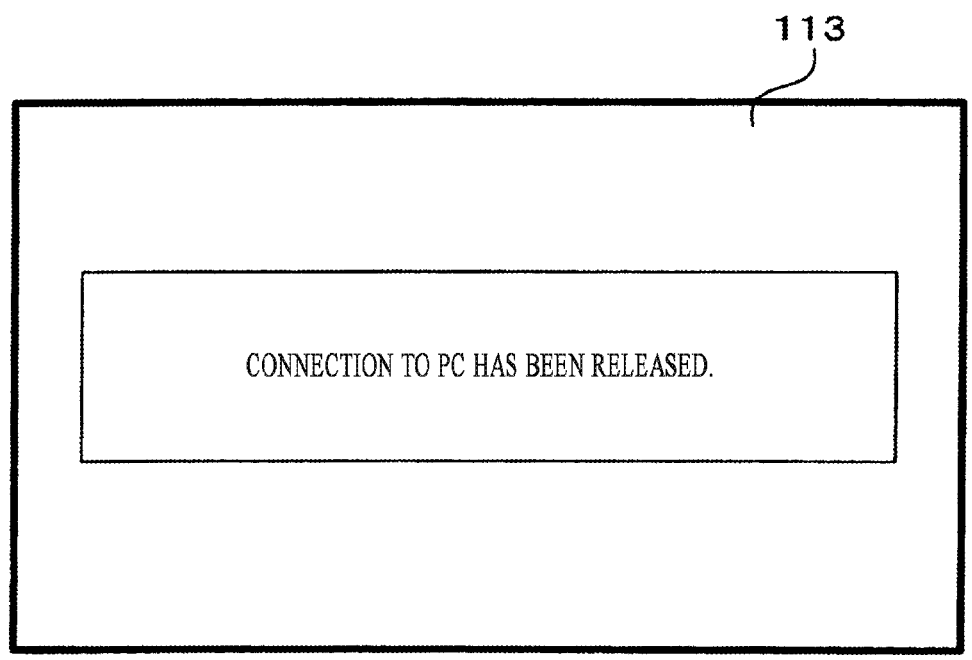
FIG. 9 shows an example of information displayed on the display unit when the mode switching of FIG. 8 is processed.

FIG. 9 shows the information displayed on the screen of the display unit 113 in Step S809. Referring to FIG. 9, a text, "A connection to the PC has been released", is displayed in a rectangular frame.

By providing Steps S808 and S809, for example, when the portable player 2 is reset for some reason or a cable through which the broadcasting receiving apparatus 1 and the PC 3 are connected to each other is disconnected regardless of a user's intention, the user may be informed that the PC communication mode has been released.

Although not specially shown, in case that the user disconnects power of the broadcasting receiving apparatus 1 when in the PC communication mode, before power supply to each of the elements of the broadcasting receiving apparatus 1 from the power supply unit 108 is cut off, the PC communication mode may be terminated and switched to the reproduction mode. In this case, in order to inform the user that the PC communication mode is terminated, a text, "A connection to the PC has been released. Is this okay?", and the buttons "Yes" and "No" may be displayed on the screen of the display unit 113. For example, when the user selects and manipulates the button "Yes", the CPU 110 may switch to the reproduction mode and then may cut off power supply, and when the user selects and manipulates the button "No", the CPU 110 may not switch to the reproduction mode but may maintain the PC communication mode and may not cut off power supply.

Figure 10:
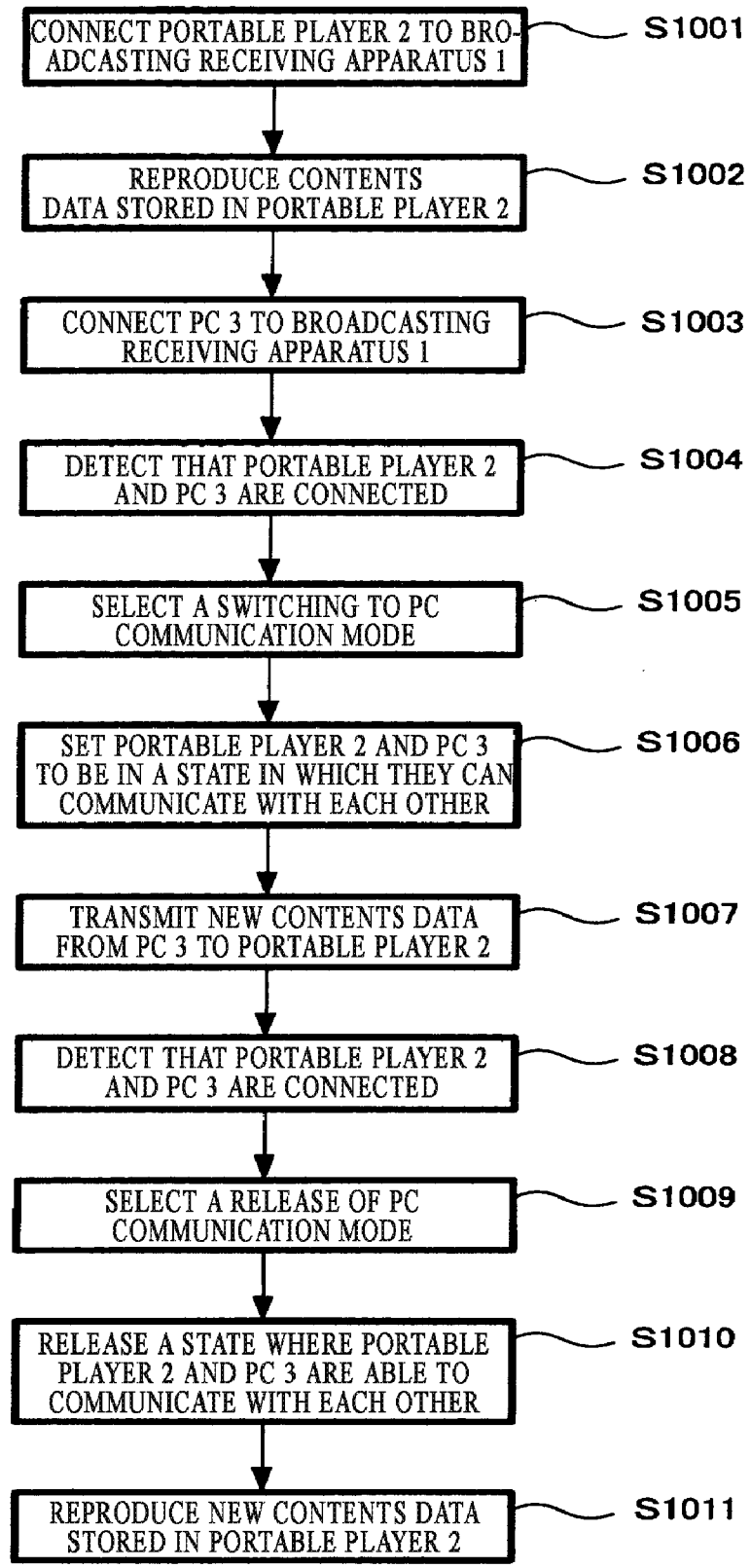
FIG. 10 is a flowchart showing an example of the use of the broadcasting receiving apparatus of FIG. 1, including the user's operations.

An example of using the broadcasting receiving apparatus 1 which is configured and operates as above will be described with reference to FIG. 10. FIG. 10 shows user's operations and an process of the broadcasting receiving apparatus 1 or the PC 3 as a flowchart. Referring to FIG. 10, in Step S1001, the user connects the portable player 2 to the connector 101 of the broadcasting receiving apparatus 1. In Step S1002, the user manipulates the remote-control receiver 4 to reproduce contents data stored in the portable player 2. In order to perform operations such as a transmission of new contents data from the PC 3 to the portable player 2, the user connects the PC 3 to the connector 102, in Step S1003. Then, in Step S1004, the broadcasting receiving apparatus 1 detects that both the portable player 2 and the PC 3 are connected.

If the user selects switching to the PC communication mode in Step S1005, the broadcasting receiving apparatus 1 is set so that the portable player 2 and the PC 3 can communicate with each other, in Step S1006. If the user manipulates the PC 3 to add new contents data to the portable player 2, the PC 3 transmits the new contents data to the portable player 2, in Step S1007. Also, the contents data may be transmitted to the PC 3 from the portable player 2. In Step S1008, the broadcasting receiving apparatus 1 detects that the portable player 2 and the PC 3 are connected. Even after the reproduction mode is switched to the PC communication mode, it may be detected always or regularly that the portable player 2 and the PC 3 are connected.

If the user selects release of the PC communication mode in Step S1009, the broadcasting receiving apparatus 1 releases a state where the portable player 2 and the PC 3 are able to communicate with each other, in Step S1010. Then, in Step S1011, the user reproduces the new contents data that is added to the portable player 2 and stored in the portable player 2. After the PC communication mode is released, the mode becomes the reproduction mode. After the PC communication mode is released, even when the PC 3 is connected to the broadcasting receiving apparatus 1, the contents data in the portable player 2 may be displayed, or may be audio-outputted by the broadcasting receiving apparatus 1.

As described above, according to the broadcasting receiving apparatus 1 of the present embodiment, by connecting the PC 3 to the broadcasting receiving apparatus 1 when the portable player 2 is connected to the broadcasting receiving apparatus 1, the contents data may be transmitted to the portable player 2 from the PC 3, in a state where the portable player 2 is not detached from the broadcasting receiving apparatus 1 but is connected to the broadcasting receiving apparatus 1. Also, the PC 3 may manipulate the portable player 2 via the broadcasting receiving apparatus 1.

When a video signal output from the PC 3 is supplied to the display unit 113 via the video image processing unit 112, the contents data to be transmitted to the portable player 2 may be selected, while the video signal output from the PC 3 may be displayed on the display unit 113.

As described above, in a broadcasting receiving apparatus according to the present invention, contents data can be added by a PC while the portable player is connected to the broadcasting receiving apparatus. Thus, a user does not need to detach the portable player from the broadcasting receiving apparatus and connect the portable player to the broadcasting receiving apparatus again and thus a user's burden may be greatly reduced.

While this invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A broadcasting receiving apparatus comprising:
an audio signal supplying unit configured to supply an audio signal to a speaker;
a first connector configured to connect a portable player that reproduces audio data;
a second connector configured to connect a personal computer (PC);
a first connection detecting unit configured to detect whether the portable player is connected to the first connector;
a second connection detecting unit configured to detect whether the PC is connected to the second connector; and
a switching control unit configured to switch to a reproduction mode in which an audio signal based on audio data reproduced by the portable player is supplied by the audio signal supplying unit to the speaker and sound based on the audio signal is generated, or a PC communication mode in which the portable player and the PC are connected to be in a state in which the portable player and the PC can communicate with each other, when the first connection detecting unit detects that the portable player is connected to the first connector and the second connection detecting unit detects that the PC is connected to the second connector.

2. The broadcasting receiving apparatus of claim 1, further comprising a video signal supplying unit configured to supply a video signal to a display unit, wherein the switching control unit supplies the video signal based on video data reproduced by the portable player to the display unit, and allows a video image based on the video signal to be displayed on the display unit in the reproduction mode.

3. The broadcasting receiving apparatus of claim 1, further comprising a device identification allowing unit configured to allow the portable player to identify the broadcasting receiving apparatus as an external device when the portable player is connected to the first connector.

4. The broadcasting receiving apparatus of claim 1, further comprising a signal switching unit configured to switch to a first state in which the portable player can be controlled by the broadcasting receiving apparatus, or a second state in which the portable player cannot be controlled by the broadcasting receiving apparatus and can be controlled by the PC, wherein the switching control unit controls the signal switching unit to be in the first state in the reproduction mode and the signal switching unit to be in the second state in the PC communication mode.

5. The broadcasting receiving apparatus of claim 1, further comprising:
 a power supply unit configured to generate power for operating the broadcasting receiving apparatus; and
 a power supply switching unit comprising a first switch for supplying power generated by the power supply unit to the portable player in the reproduction mode and power generated by the PC to the portable player in the PC communication mode.

6. The broadcasting receiving apparatus of claim 5, further comprising a second switch that is switched depending on whether power supplied by the power supply unit or the PC is to be supplied to the portable player or not, and the switching control unit temporarily cuts off power supply to the portable player by using the second switch according to a switching timing at which the reproduction mode is switched to the PC communication mode and according to a switching timing at which the PC communication mode is switched to the reproduction mode.

7. The broadcasting receiving apparatus of claim 6, wherein the switching control unit controls the second switch to start cutoff of power supply before the switching timing and to restart power supply after the switching timing so that the switching timing is within time at which power supply to the portable player is cut off, or to temporarily cut off power supply to the portable player after the switching timing.

8. The broadcasting receiving apparatus of claim 1, further comprising a display control unit configured to control the broadcasting receiving apparatus in the reproduction mode to display on the display unit an information indicating that the reproduction mode can be switched to the PC communication mode.

9. The broadcasting receiving apparatus of claim 1, further comprising a display control unit configured to control the broadcasting receiving apparatus in the PC communication mode to display on the display unit an information indicating that the PC communication mode can be switched to the reproduction mode.

* * * * *